United States Patent
Bidner

(10) Patent No.: US 10,138,772 B2
(45) Date of Patent: Nov. 27, 2018

(54) SYSTEM AND METHOD FOR REDUCING FRICTION

(71) Applicant: Ford Global Technologies, LLC, Dearborn, MI (US)

(72) Inventor: David Karl Bidner, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 944 days.

(21) Appl. No.: 14/171,641

(22) Filed: Feb. 3, 2014

(65) Prior Publication Data

US 2015/0218981 A1 Aug. 6, 2015

(51) Int. Cl.
| | |
|---|---|
| F02B 25/06 | (2006.01) |
| F01M 9/04 | (2006.01) |
| F01M 9/10 | (2006.01) |
| F01M 13/02 | (2006.01) |
| F02B 43/02 | (2006.01) |
| F02B 43/10 | (2006.01) |
| F16H 57/027 | (2012.01) |

(52) U.S. Cl.
CPC ........... *F01M 9/04* (2013.01); *F01M 9/10* (2013.01); *F01M 13/022* (2013.01); *F01M 13/028* (2013.01); *F02B 43/02* (2013.01); *F02B 43/10* (2013.01); *F02B 2043/103* (2013.01); *F16H 57/027* (2013.01)

(58) Field of Classification Search
USPC ........................................... 123/574
See application file for complete search history.

(56) References Cited

U.S. PATENT DOCUMENTS

| | | | |
|---|---|---|---|
| 6,167,874 B1 | 1/2001 | Becker et al. | |
| 2007/0063594 A1* | 3/2007 | Huynh | H02K 9/06 310/59 |
| 2008/0116030 A1* | 5/2008 | Steinborn | F16H 3/12 192/223.3 |
| 2012/0123635 A1* | 5/2012 | Brevick | F02M 31/04 701/36 |
| 2013/0046454 A1* | 2/2013 | Cowgill | F02D 19/024 701/104 |

(Continued)

FOREIGN PATENT DOCUMENTS

| | | |
|---|---|---|
| CN | 101629503 A | 1/2010 |
| JP | H07189817 A | 7/1995 |
| JP | 2012241658 A | 12/2012 |

OTHER PUBLICATIONS

Anonymous, "Thumper Apparatus for the Development of Event Data Report and Global Restraint Crash Sensing Systems," IPCOM No. 000239195, Published Oct. 20, 2014, 9 pages.

(Continued)

*Primary Examiner* — Lindsay Low
*Assistant Examiner* — Ruben Picon-Feliciano
(74) *Attorney, Agent, or Firm* — Julia Voutyras; McCoy Russell LLP

(57) ABSTRACT

Systems and methods are described for reducing friction within a transmission and an internal combustion engine including a PCV system. A gaseous fuel source is fluidly coupled to the transmission via a flow control valve and the transmission, in turn, is fluidly coupled to an air inflow line of the PCV system. The flow control valve is configured to control a flow of gaseous fuel into the transmission and thereon into the PCV system and crankcase.

19 Claims, 5 Drawing Sheets

(56) References Cited

U.S. PATENT DOCUMENTS

2013/0296094 A1* 11/2013 Mack .................... H02K 7/003
475/150

OTHER PUBLICATIONS

Bidner, David K., "System and Method for Reducing Friction in Engines," U.S. Appl. No. 14/014,197, filed Aug. 29, 2013, 38 pages.
Bidner, David K., "System and Method for Reducing Power Train Air Resistance," U.S. Appl. No. 13/895,192, filed May 15, 2013, 43 pages.
State Intellectual Property Office of the People's Republic of China, Office Action and Search Report Issued in Application No. 201510050391.2, dated Jun. 4, 2018, 8 pages. (Submitted with Partial Translation).

* cited by examiner

SYSTEM AND METHOD FOR REDUCING FRICTION

TECHNICAL FIELD

The present application relates to reducing friction in an engine and a transmission of a vehicle.

BACKGROUND AND SUMMARY

Resistance and friction from air surrounding one or more moving components (for e.g., a transmission with high speed gears, a crankcase, etc.) of a vehicle's propulsion system can contribute to fuel efficiency losses and system degradation. These losses may be most pronounced within a crankcase of a vehicle which may be turbulent particularly at high engine speeds. Further, air surrounding the crankshaft may contain suspended oil droplets which can increase drag forces due to an increase in density, thereby increasing engine load and decreasing fuel economy.

In the power generation industry, friction from air surrounding high speed electrical machinery may be reduced by flooding the machinery with hydrogen gas, which has a lower viscosity than air. However, hydrogen gas may be easily ignited.

Since air resistance is proportional to the density of the air surrounding rotating components, friction losses may also be reduced by decreasing this density. Density may be decreased by decreasing the amount of air within the case or enclosure containing the rotating system by creating a vacuum within the system. However, since air flow over the rotating components provides cooling effects to reduce degradation from overheating, eliminating or reducing the volume of air coming into contact with the rotating components can have negative effects on the machinery.

The inventors herein have recognized the above issues and identified an approach to at least partly address the issues. One example approach that at least partially addresses the above issues and that can achieve the technical result of reducing friction in an internal combustion engine is to fill or partially fill the engine transmission and crankcase with a gaseous fuel such as methane. For example, the inventors have realized that by replacing at least some of the air within the engine crankcase with a lower density gas, suspended oil droplets may impinge more easily to form fewer larger drops thus reducing the effective air density within the crankcase. Therefore, air resistance can be decreased while providing sufficient engine cooling. Furthermore, the viscosity of methane is substantially lower than air and the flammability of methane in air is limited.

Thus, in one embodiment, a vehicle system comprises an internal combustion engine including a positive crankcase ventilation (PCV) system, a gaseous fuel source and a transmission wherein the gaseous fuel source is fluidly coupled to the transmission via a flow control valve and the transmission is fluidly coupled to a fresh air line of the PCV system. The flow control valve is configured to control the flow of gaseous fuel into the transmission case. In this way, an existing source can supply gaseous fuel into the transmission case and thereafter, into the crankcase via the PCV fresh air line to reduce friction within both cases. By introducing the gaseous fuel into the crankcase via the PCV fresh air line, its flow may be advantageously utilized to carry blow-by gases into the intake manifold via the PCV valve.

In another embodiment, during a first condition, a method comprises delivering gaseous fuel from a gaseous fuel source to a transmission, and subsequently, a PCV system of an internal combustion engine, wherein the first condition comprises a calculated blow-by flow rate being less than a PCV valve flow rate. In this way, a gaseous fuel may be delivered into a transmission and a crankcase based on an existing PCV valve flow rate. By ensuring that gaseous fuel is drawn into the cases when a modeled blow-by flow rate is less than the PCV valve flow rate, an excess flow of gaseous fuel may be prevented. Additionally, an undue increase in crankcase pressure may also be avoided. Further, by controlling the flow of gaseous fuel based on an estimated blow-by flow, a desired air-fuel ratio may be maintained while reducing friction in the transmission and crankcase.

In a further embodiment, a vehicle may comprise a gaseous fuel source, an internal combustion engine including a PCV system and a transmission, wherein the gaseous fuel source is fluidly coupled to the transmission via a flow control valve, the flow control valve configured to control the flow of gaseous fuel into the transmission, and a controller having executable instructions to during a first condition, deliver gaseous fuel from a gaseous fuel source to the transmission and subsequently the PCV system of an internal combustion engine, wherein the first condition comprises a calculated blow-by flow rate being less than a PCV valve flow rate and a manifold vacuum being greater than a crankcase vacuum, wherein a flow rate of the gaseous fuel is calculated from a difference between a PCV valve flow rate and a blow-by gas flow rate, wherein the blow-by gas flow rate is calculated based on engine operating conditions.

In this way, aerodynamic friction losses experienced within a transmission and a crankcase may be diminished by partially filling each of the cases with a low density gas. An existing gaseous fuel source within a vehicle may be utilized for this purpose thus enabling cost and space savings. By flowing the gas when a modeled blow-by rate is less than a PCV valve flow rate, the fuel flow may compensate for the existing difference in flow rates. Further, by flowing the low density gas under conditions where the manifold vacuum is greater than crankcase vacuum, the gaseous fuel may be drawn easily along with blow-by gases into the manifold. Overall, benefits in fuel economy may be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
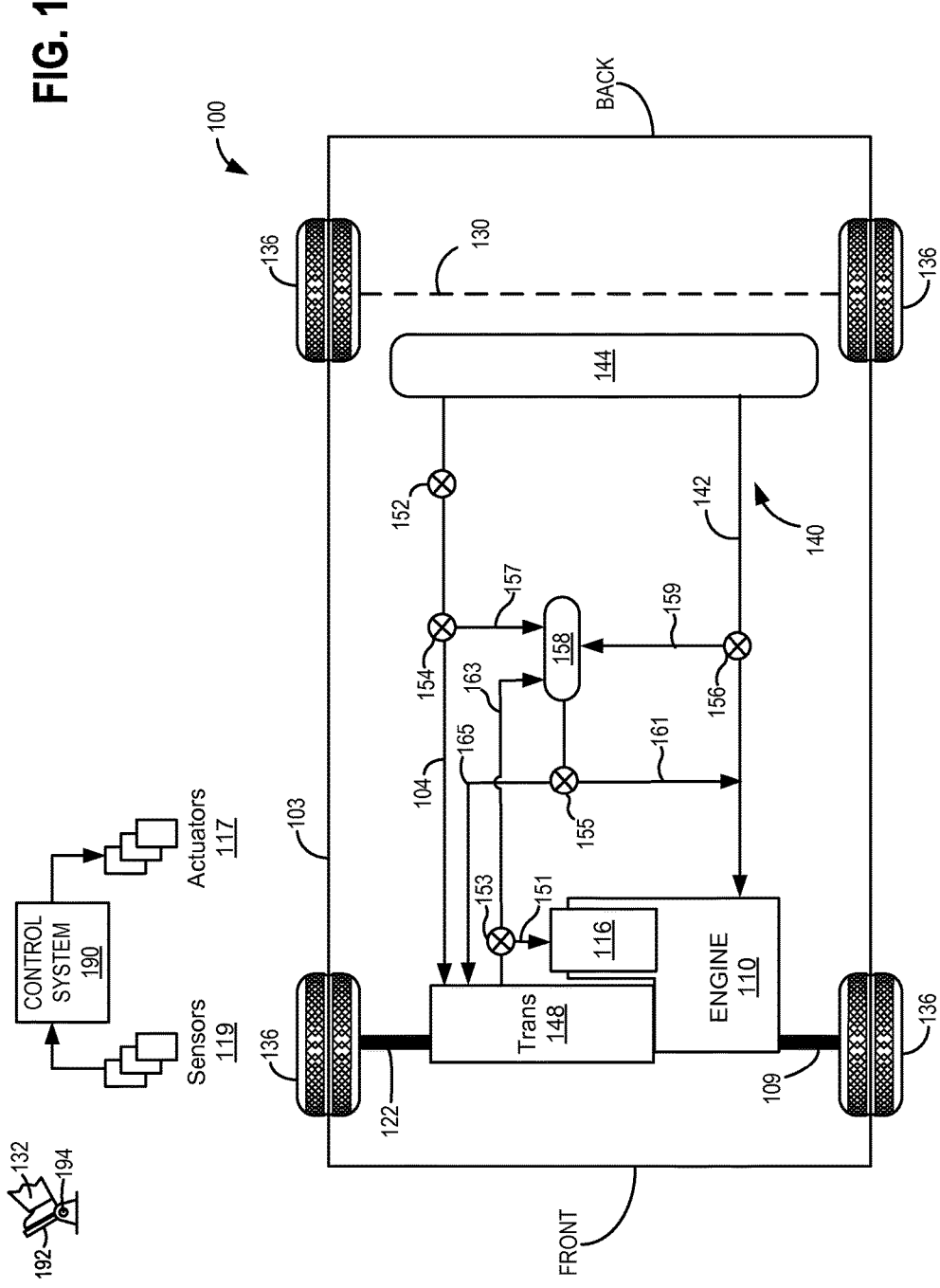
FIG. 1 schematically depicts an example embodiment of a vehicle according to this disclosure.

In the propulsion system of a vehicle such as that shown in FIG. 1, power loss from air resistance is directly proportional to the density of the gas or fluid in which the component is rotating. Therefore, such power losses can be reduced by decreasing the density of the gas surrounding rotating components such as those found in the transmission and crankcase.

In addition to power losses, an amount of heat may be produced via mutual friction between rotating components. To prevent engine overheating, this heat may be removed and displaced in another location such as the atmosphere or cabin via a cooling system or vehicle movement during operation. Thus, though power losses may be diminished in an airless vacuum or low pressure case, heat removal may be decreased or eliminated leading to engine degradation. Therefore, air resistance mitigation ought to balance power losses from air resistance with desired cooling when determining pressure within transmission and crank cases.

Density and thus, resistance within a rigid case (e.g. transmission, engine crankcase) is a function of both the mass of gas within the case as well as the molecular properties of the gas contained. At standard temperature and pressure, ambient air has a density of approximately 1.2 $kg/m^3$ whereas methane has a density around 0.66 $kg/m^3$. Thus, the density of the gas and power loss from resistance may be decreased by replacing ambient air within a transmission and/or a crankcase with an amount of methane gas or an ambient air-methane gas mixture.

Compressed natural gas (CNG) engines may operate using a fuel source that contains an amount of methane for combustion. Therefore, in CNG engines, a supply of methane may be available for delivery to the engine PCV system without the addition of an extra methane source. Further, in CNG engines, methane evacuated from an engine PCV system after absorbing an amount of heat in the transmission and engine crankcase may be cycled into the engine fuel line for combustion, minimizing fuel losses.

Figure 2:
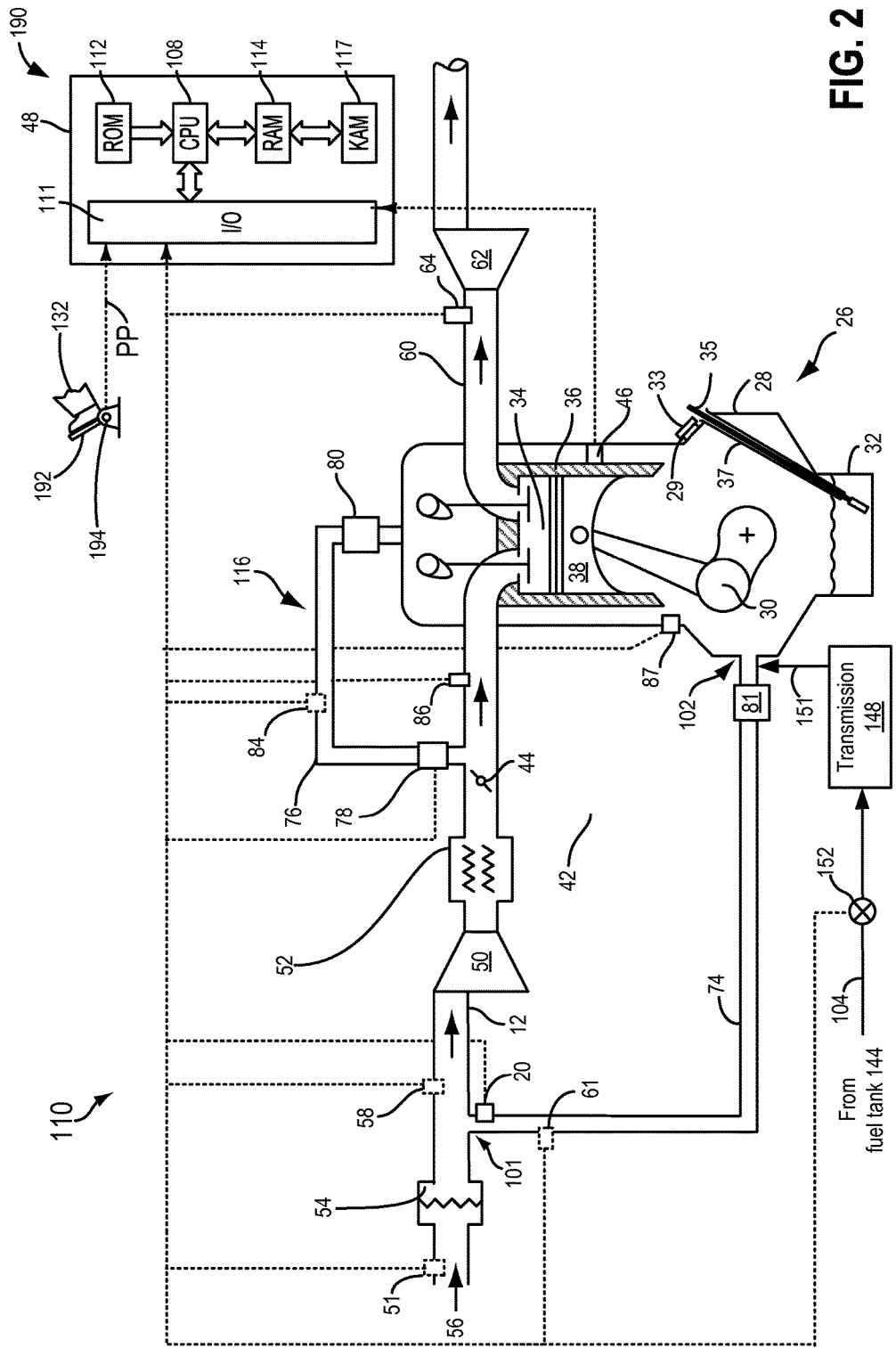
FIG. 2 illustrates an example of an engine with a positive crankcase ventilation (PCV) system.

In one example, the system disclosed herein may be used in a conventional front wheel drive (FWD) or rear wheel drive (RWD) vehicle with an internal combustion engine fueled by CNG. Gaseous fuel for e.g., CNG, may be supplied to a transmission case and thereon to the fresh air intake of a PCV system and a crankcase as shown in FIGS. 1 and 2. A controller may be configured to perform routines such as those shown in FIGS. 3 and 4 to control the quantity of gaseous fuel supplied to the transmission and engine PCV system based on the PCV valve flow rate and various engine operating conditions. Gaseous flow may also depend on engine events such as deceleration fuel shut off (DFSO), start stop events and the like (FIG. 5).

In non-CNG engine embodiments, CNG may be provided to the transmission via a separate CNG source tank. In these embodiments, CNG may be delivered to the transmission and later transferred to an air intake of the engine PCV system for combustion or may be evacuated from the vehicle. Still further embodiments of non-CNG engines may have a closed CNG circuit for circulating CNG through the transmission, engine PCV system and crankcase.

FIG. 1 schematically depicts an example vehicle system 100 as shown from a top view. Vehicle system 100 includes a vehicle body 103 with a front end, labeled "FRONT", and a back end labeled "BACK." Vehicle system 100 may include a plurality of wheels 136. For example, as shown in FIG. 1, vehicle system 100 may include a first pair of wheels adjacent to the front end of the vehicle and a second pair of wheels adjacent the back end of the vehicle.

Vehicle system 100 includes a fuel burning internal combustion engine 110 coupled to transmission 148. Engine 110 may consume a liquid fuel (e.g. gasoline) or a gaseous fuel (e.g. natural gas, methane) to produce an engine output. Vehicle system 100 is also depicted as having a FWD transmission where engine 110 drives the front wheels via half shafts 109 and 122. In another embodiment, vehicle system 100 may have a RWD transmission which drives the rear wheels via a driveshaft (not shown) and a differential (not shown) located on rear axle 130.

Engine 110 may be operated by combusting fuel received from fuel system 140 via fuel line 142. Fuel system 140 may include one or more fuel storage tanks 144 for storing fuel on-board the vehicle. For example, fuel tank 144 may store a condensed natural gas (CNG) fuel source, such as methane gas. Other embodiments may have a first gaseous fuel source stored in fuel tank 144 and a second liquid fuel source stored in an additional fuel tank. In some examples, the fuel may be stored on-board the vehicle as a blend of two or more different fuels. A liquid fuel source may be configured to store a blend of gasoline and ethanol (e.g. E10, E85, etc.) or a blend of gasoline and methanol (e.g. M10, M85, etc.). A gaseous fuel source may be a blend of methane, hydrogen gas, oxygen gas, or carbon monoxide. Fuels or fuel blends may be delivered to engine 110 by fuel line 142. Still other suitable fuels or fuel blends may be supplied to engine 110, where they may be combusted at the engine to produce an engine output.

Engine 110 includes a positive crankcase ventilation (PCV) system 116 to clear blow-by gases from the crankcase. Engine 110 further contains rotational and reciprocating components that move within the engine crankcase while transmission 148 includes multiple gears rotating at high speeds. Traditionally the rotating and reciprocating components are in an air filled enclosure and thus experience efficiency losses from air resistance. Atmospheric air has a density near 1.22 $kg/m^3$ whereas methane has a density of 0.66 $kg/m^3$ and therefore, energy losses may be lower in a methane filled enclosure.

Thus, in an embodiment, gaseous fuel comprising compressed natural gas (CNG) or methane may be directed from fuel tank 144 through transmission 148 into PCV system 116 of engine 110. Methane may be provided to transmission 148 via fuel line 104 from fuel tank 144. Flow control valve 152 controls the delivery of an amount of CNG (or methane) to transmission 148. Methane may be transferred from transmission 148 to PCV system 116 via three way valve 153 and line 151. During vehicle operation, for example, when delivery of gaseous fuel to the transmission is stopped, gaseous fuel in fuel line 104 may be directed via three way valve 154 and line 157 to purge canister 158 for storage. In another example, during engine conditions when gaseous fuel cannot be transferred from transmission 148 to PCV system 116, it may be guided to purge canister 158 via three way valve 153 and line 163. For example, gaseous fuel may be diverted to purge canister 158 from transmission 148 when intake manifold vacuum falls below crankcase vacuum. As an example, purge canister 158 may be filled with an appropriate adsorbent for temporarily trapping fuel vapors (including vaporized hydrocarbons). In one example, the adsorbent used may be activated charcoal. In some embodiments, the engine crankcase may be sealed to prevent the escape of methane and may form a pressure vacuum.

Gaseous fuel from fuel line 142 may also be directed via three-way valve 156 and line 159 to purge canister 158. During vehicle operation, for example, when delivery of gaseous fuel to engine 110 is stopped, gaseous fuel in fuel line 142 may be directed to purge canister 158 for storage. Delivery of gaseous fuel to the engine 110 may be stopped when the engine is turned off, or during deceleration fuel shut-off (DFSO), as examples. By directing gaseous fuel remaining in fuel lines 104, 163 and 142 to purge canister 158 when delivery of gaseous fuel to transmission 148, PCV system 116 and engine 110 is stopped, emission of fuel vapors to the atmosphere can be reduced. Control system 190 may actuate three-way valves 153, 154, and 156 to direct gaseous fuel to the purge canister 158.

Three-way valve 155 may be responsive to operating conditions and may couple purge canister 158 to fuel line 142 or to transmission 148. As an example, gaseous fuel may be delivered to fuel line 142 via fuel line 161 for engine combustion or to transmission 148 via three-way valve 155 and fuel line 165 when sufficient pressure in the purge canister is available. For example, if the PCV valve flow rate is more than an estimated blow-by rate and purge canister load is higher than a threshold, three-way valve 155 may fluidly couple purge canister 158 to transmission 148. In another example, if a purge canister pressure is greater than a PCV system pressure, then gaseous fuel stored in purge canister 158 may be directed to the transmission 148 via three-way valve 155 by control system 190. When operating conditions do not allow the delivery of gaseous fuel to transmission 148, three-way valve 155 may couple purge canister 158 to the fuel line 142. For example, if manifold vacuum is lower than crankcase vacuum and the purge canister has sufficient stored content, the fuel may be released into engine 110 for combustion. If the engine is shut down, fuel may be stored in purge canister 158 for subsequent combustion when the engine is operating. Purge canister 158 may provide a pressure differential to accelerate fuel into the fuel lines 165 and 142. Three-way valve 155 may therefore be responsive to the pressure available in purge canister 158. If sufficient pressure is not available to accelerate fuel from purge canister 158 to fuel lines 165 and/or 142, valve 155 may close so that gaseous fuel may be stored in purge canister 158 until sufficient pressure is accumulated in the canister. Three-way valve 155 may be controlled by control system 190.

A flow control valve 152 may control the flow rate of gaseous fuel into transmission 148. The gaseous fuel flow rate may be controlled by a control system 190 via flow control valve 152 in response to input from one or more sensors 119, and/or based on engine operating conditions. As an example, sensors 119 may monitor temperature, pressure, and/or oxygen content within the engine 110. An additional sensor (not shown) located downstream from valve 152 may monitor the gaseous fuel flow rate in fuel line 104. Valve 152 may also be responsive to pressure within fuel line 104 so as to maintain a pressure for minimal atmospheric air leakage.

Control system 190 may communicate with one or more of engine 110, fuel system 140, and transmission 148 and may receive sensory feedback information from one or more of engine 110, fuel system 140, PCV system 116 and transmission 148. Further, control system 190 may send control signals to one or more of engine 110, fuel system 140, flow control valve 152 responsive to this sensory feedback. Control system 190 may receive an indication of an operator requested output of the vehicle propulsion system from a vehicle operator 132. For example, control system 190 may receive sensory feedback from pedal position (PP) sensor 194 which communicates with pedal 192. Pedal 192 may refer schematically to a brake pedal and/or an accelerator pedal.

Fuel system 140 may periodically receive fuel from a fuel source residing external to the vehicle. As a non-limiting example, the propulsion system of vehicle system 100 may be refueled by receiving fuel via a fuel dispensing device (not shown). In some embodiments, fuel tank 144 may be configured to store the fuel received from fuel dispensing device until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication lamp.

Referring now to FIG. 2, it shows an example configuration of a multi-cylinder engine generally depicted at 110, which may be included in a propulsion system of an automobile. Engine 110 may be controlled at least partially by a control system 190 of the vehicle including controller 48 and by input from a vehicle operator 132 via an input device 192. In this example, input device 192 includes an accelerator pedal and a pedal position sensor 194 for generating a proportional pedal position signal PP.

Engine 110 may include a lower portion of the engine block, indicated generally at 26, which may include a crankcase 28 encasing a crankshaft 30. Crankcase 28 contains gas and may include an oil sump 32, otherwise referred to as an oil well, holding engine lubricant (e.g., oil) positioned below the crankshaft 30. An oil fill port 29 may be disposed in crankcase 28 so that oil may be supplied to oil sump 32. Oil fill port 29 may include an oil cap 33 to seal oil fill port 29 when the engine is in operation. A dip stick tube 37 may also be disposed in crankcase 28 and may include a dipstick 35 for measuring a level of oil in oil sump 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (e.g., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injectors (not shown) and intake air from intake manifold 42 which is positioned downstream of throttle 44. The engine block 26 may also include an engine coolant temperature (ECT) sensor 46 input into a controller 48 (described in more detail below herein).

A throttle 44 may be disposed in the engine intake to control the airflow entering intake manifold 42 and may be preceded upstream by compressor 50 followed by charge air cooler 52, for example. Compressor 50 may compress the intake air to engine 110, thereby boosting intake air pressure and density providing boosted engine conditions (e.g., manifold air pressure>barometric pressure), for example during increased engine loads. An air filter 54 may be positioned upstream of compressor 50 and may filter fresh air entering intake passage 56.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate (not shown) bypassing it, and turbine 62 may be driven by the flow of exhaust gases. Furthermore, turbine 62 may be mechanically coupled to compressor 50 via a common shaft (not shown), such that rotation of turbine 62 may drive compressor 50. Sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 48.

In the example of FIG. 2, a positive crankcase ventilation system (PCV) 116 is coupled to the engine fresh air intake 12 so that gases in crankcase 28 may be vented in a controlled manner. During normal engine operation, gases in the combustion chamber 34 may escape past the piston. These blow-by gases may include unburned fuel, combustion products, and air. Blow-by gases can dilute and contaminate oil, causing corrosion to engine components and contributing to sludge build-up, reducing the protective and lubricating properties of the oil. At higher engine speeds, blow-by gases can increase crankcase pressure such that oil leakage may occur from sealed engine surfaces. The PCV system 116 may help to vent and remove blow-by gases from the engine crankcase in a controlled manner in order to mitigate these harmful effects of blow-by gases and may combine them with an engine intake stream so that they may be combusted within the engine. By redirecting blow-by gases to the engine intake, the PCV system 116 aids in reducing engine emissions by precluding venting of blow-by gases to the atmosphere.

The PCV system 116 includes a PCV valve 78 fluidly coupled to an engine crankcase 28. As an example, the PCV valve 78 may be coupled to a valve cover in the engine, which may allow for the PCV system to draw blow-by gases from the engine while reducing the entrainment of oil from the crankcase. The PCV valve 78 may also be fluidly coupled to the engine intake manifold 42. The PCV valve gas flow rate may vary with engine conditions such as engine speed and load, and the PCV valve 78 may be calibrated for a particular engine application wherein the PCV valve gas flow rate may be adjusted as operating conditions change. As an example, when the engine is off, the PCV valve 78 may be closed and no gases may flow through. When the engine speed is idling or low, or during deceleration when the intake manifold vacuum is relatively high, the PCV valve 78 may open slightly, allowing for restricted PCV valve gas flow rates. At engine speeds or loads higher than idling, intake manifold vacuum may lower, and the PCV valve 78 may allow for higher PCV valve gas flow rates. PCV valve 78 may include a conventional PCV valve or a push-pull type PCV valve.

During non-boosted conditions (when intake manifold air pressure (MAP) is less than barometric pressure (BP)), the PCV system 116 draws air into crankcase 28 via a breather or crankcase ventilation (vent) tube 74. A first end 101 of crankcase ventilation tube 74 may be mechanically coupled, or connected, to fresh air intake 12 upstream of compressor 50. In some examples, the first end 101 of crankcase ventilation tube 74 may be coupled to fresh air intake 12 downstream of air filter 54 (as shown). In other examples, the crankcase ventilation tube may be coupled to fresh air intake 12 upstream of air filter 54. In yet another example, the crankcase ventilation tube may be coupled to air filter 54. A second end 102, opposite first end 101 of crankcase ventilation tube 74, may be mechanically coupled, or connected, to crankcase 28 via an oil separator 81.

In some embodiments, crankcase ventilation tube 74 may include a pressure sensor 61 coupled therein. Pressure sensor 61 may be an absolute pressure sensor or a gauge sensor. One or more additional pressure and/or flow sensors may be coupled to the PCV system 116 at alternate locations. For example, a barometric pressure sensor (BP sensor) 51 may be coupled to intake passage 56, upstream of air filter 54, for providing an estimate of barometric pressure (BP). In one example, where pressure sensor 61 is configured as a gauge sensor, BP sensor 51 may be used in conjunction with pressure sensor 61. In some embodiments, a compressor inlet pressure (CIP) sensor 58 may be coupled in intake passage 56 downstream of air filter 54 and upstream of compressor 50 to provide an estimate of the compressor inlet pressure (CIP).

During non-boosted conditions, the PCV system 116 vents air out of the crankcase and into intake manifold 42 via conduit 76 which may include a one-way PCV valve 78 to provide continual evacuation of gases from inside the crankcase 28 to the intake manifold 42. In one embodiment, the PCV valve 78 may vary its flow restriction in response to the pressure drop across it (or flow rate through it). In still other examples, the PCV valve may be an electronically controlled valve that is controlled by controller 48. It will be appreciated that, as used herein, PCV flow refers to the flow of gases through conduit 76 from the crankcase to the intake manifold 42. As an example, the PCV flow may be determined from the fuel (e.g., gaseous fuel) injection rate, the air/fuel ratio in the engine intake, and the exhaust oxygen content via exhaust gas sensor 64, using known methods.

As used herein, PCV backflow refers to the flow of gases through conduit 76 from the intake manifold 42 to the crankcase 28. PCV backflow may occur when intake manifold pressure is higher than crankcase pressure (e.g., during boosted engine operation). In some examples, PCV system 116 may be equipped with a check valve for preventing PCV backflow. It will be appreciated that while the depicted example shows PCV valve 78 as a passive valve, this is not meant to be limiting, and in alternate embodiments, PCV valve 78 may be an electronically controlled valve (e.g., a powertrain control module (PCM) controlled valve) wherein a controller 48 of control system 190 may command a signal to change a position of the valve from an open position (or a position of high flow) to a closed position (or a position of low flow), or vice versa, or any position there-between.

During boosted conditions (when MAP is greater than BP), gases may flow via crankcase ventilation tube 74 from the crankcase through oil separator 81 and into fresh air intake 12 and eventually into the combustion chamber 34. This may be done in a stale air manner where no intake manifold air is let into the crankcase 28 or in a positive crankcase ventilation manner where some manifold air is metered into the crankcase 28.

While the engine is running under light load and moderate throttle opening, the intake manifold air pressure may be less than crankcase air pressure. The lower pressure of the intake manifold 42 draws fresh air towards it, pulling air via crankcase ventilation tube 74 through the crankcase (where it dilutes and mixes with combustion gases), and out of the crankcase via conduit 76 through the PCV valve 78, and into the intake manifold 42. However, during other conditions, such as heavy load or under boosted conditions, the intake manifold air pressure may be greater than crankcase air pressure. As such, intake air may travel through the conduit 76 and into the crankcase 28.

The gases in crankcase 28 may include un-burned fuel, un-combusted air, and fully or partially combusted gases. Further, lubricant mist may also be present. As such, various oil separators may be incorporated in positive PCV system 116 to reduce exiting of the oil mist from the crankcase 28 through the PCV system 116. For example, conduit 76 in the PCV system may include a uni-directional oil separator 80 which filters oil from vapors exiting crankcase 28 before they re-enter the intake manifold 42. Another oil separator 81 may be disposed in crankcase ventilation tube 74 to remove oil from the stream of gases exiting the crankcases during boosted operation. Additionally, in some embodiments, conduit 76 may also include a vacuum sensor 84 coupled to the PCV system 116.

Controller 48 is shown in FIG. 2 as a microcomputer, including microprocessor unit 108, input/output device 111, an electronic storage medium for executable programs and calibration values shown as read only memory chip 112 in this particular example, random access memory 114, keep alive memory 117, and a data bus. Controller 48 may receive various signals from various sensors coupled to engine 110, engine coolant temperature (ECT) from temperature sensor 46; a measurement of intake manifold pressure (MAP) from pressure sensor 86; a measurement of crankcase pressure from pressure sensor 87, a measurement of barometric pressure from BP sensor 51; exhaust gas air/fuel ratio from exhaust gas sensor 64; and other PCV diagnostic sensors described below. Storage medium read-only memory 112 can be programmed with computer readable data representing instructions executable by processor 108 for performing the methods described below, as well as other variants that are anticipated but not specifically listed.

Under certain conditions, the PCV system 116 may be monitored by a variety of sensors in the PCV system 116. In some embodiments, a plurality of absolute sensors, e.g., a barometric pressure sensor (BP) 51, a compressor inlet pressure sensor (CIP) 58, and/or a pressure sensor 61 in the crankcase ventilation tube 74, may be used in combination to monitor PCV system pressure. For example, in some approaches, a barometric pressure sensor 51, a compressor inlet sensor (CIP) 58, and a pressure sensor 61 in the PCV crankcase ventilation tube 74 may all be used in to monitor PCV system pressure.

In an alternate embodiment, MAP and compressor inlet pressure (CIP) and/or MAP and crankcase pressure may be used instead of MAP and BP to determine when the engine is boosted or not boosted. For example, when MAP is less than CIP, the engine may not be boosted. In another example, when MAP is greater than CIP or crankcase pressure, the engine may be boosted.

As described earlier for FIG. 1, gaseous fuel such as methane may be delivered from fuel tank 144 via gaseous fuel flow control valve 152 in fuel line 104 to a transmission 148. As shown in the example of FIG. 2, the gaseous fuel may be delivered from transmission 148 to an air inflow line, such as crankcase ventilation tube 74, of PCV system 116 via line 151. Delivering gaseous fuel such as methane to the transmission and via the PCV system to the crankcase containing rotating components may decrease the amount of air within the transmission and crankcase and replace it with a gas of lower density. The lower density gas may result in reduced friction and resistance experienced by moving components, cooler operation, and greater efficiency. For example, the density and viscosity of methane gas is lower than air, and thus partially or completely replacing air by methane gas aids in lowering transmission and engine friction due to air resistance while maintaining cooling effects.

Furthermore, ignition of fuel may cause degradation of engine components. Because methane is flammable within a limited air/fuel ratio window (e.g., 5-15% methane in air), methane provides a broader range of air/fuel ratios for engine operation as compared to other lower density fuels such as hydrogen. The flammability threshold may also be responsive to the pressure such that the desired pressure may be a function of the air/fuel ratio from methane injection as well as the pressure within the system that is achieved by the increased amount of methane injection.

In this manner, a vehicle system may comprise an internal combustion engine including a PCV system with a transmission fluidly coupled to a gaseous fuel source via a flow control valve. The flow control valve may be configured to control a flow of gaseous fuel into the transmission and from there on to the PCV system via an air inflow line of the PCV system. Furthermore, the vehicle system may further comprise a purge canister (not shown in FIG. 2) fluidly coupled to the transmission, and fluidly coupled to a fuel line. Further still, the gaseous fuel source may comprise methane, and a gaseous fuel viscosity may be lower than a viscosity of air.

In this manner, a vehicle comprising an internal combustion engine including a PCV system with a transmission fluidly coupled to a gaseous fuel source via a flow control valve may have a controller having executable instructions to deliver gaseous fuel from a gaseous fuel source to the transmission and thereon to a PCV system of an internal combustion engine responsive to a blow-by flow rate being less than a PCV valve flow rate and a manifold vacuum being greater than a crankcase vacuum. The transmission may be fluidly coupled to an air inlet line of the PCV system and via the PCV system to the crankcase, and the flow control valve may be configured to deliver the gaseous fuel at a gaseous fuel flow rate of a difference between the PCV valve flow rate and the blow-by gas flow rate. Furthermore, the executable instructions may further comprise closing the flow control valve in response to the manifold vacuum dropping below a crankcase vacuum.

Figure 3:
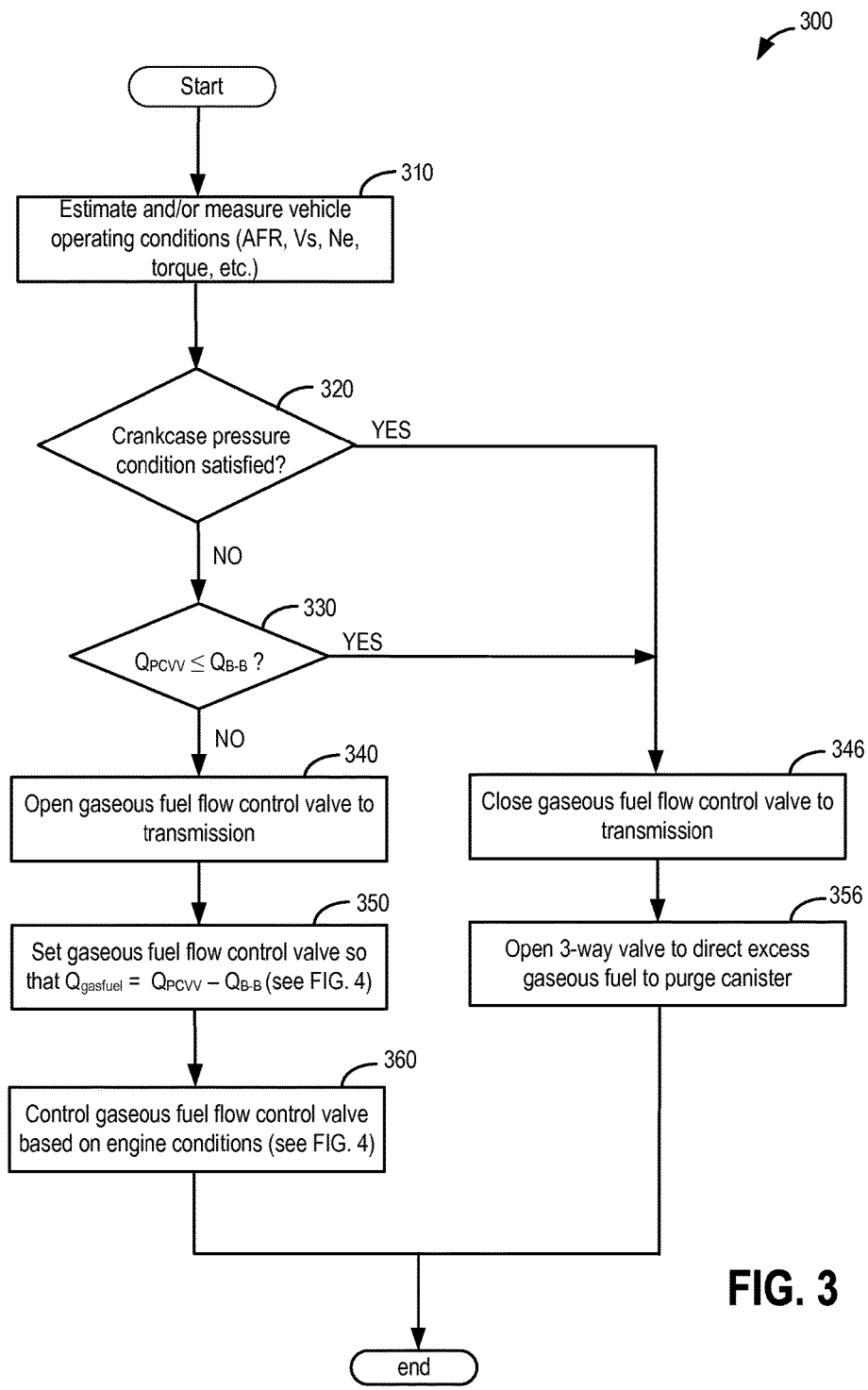
FIG. 3 depicts a flowchart demonstrating conditions during which gaseous fuel may be delivered into the transmission.

Turning now to FIG. 3, it shows a high-level example routine 300 for controlling the flow of a gaseous fuel into a transmission and further on into a crankcase of an engine, such as engine 110 of FIGS. 1 and 2 via a PCV system.

Routine 300 may begin at 310 where engine operating conditions such as torque (Tq), vehicle speed (Vs), engine speed (Ne), air/fuel ratio (AFR) may be determined. For example, engine speed (Ne) may affect the manifold vacuum that is needed to draw in blow-by vapors. After engine conditions are determined routine 300 continues to 320 where it may be confirmed if a crankcase pressure condition is satisfied. In one example, the crankcase pressure condition may be satisfied if the manifold vacuum is greater than the vacuum in the crankcase. If the intake manifold vacuum is less than a crankcase vacuum, then PCV blow-by and gaseous fuel directed to the crankcase or the crankcase inlet may not be conveyed to the engine intake. Intake manifold vacuum may be measured by a pressure sensor positioned at or near the intake manifold, such as vacuum sensor 84 in PCV conduit and/or by intake pressure sensor 86. Furthermore, crankcase pressure or crankcase vacuum may be measured by a pressure or vacuum sensor positioned at the crankcase, such as pressure sensor 87.

When the intake manifold vacuum is less than the crankcase vacuum, delivery of gaseous fuel to the engine crankcase 28 may not be reliably controlled, as compared to when the intake manifold vacuum is greater than the crankcase vacuum. For example, when the intake manifold vacuum is less than a crankcase vacuum, the manifold vacuum may not be high enough to pull gaseous fuel from the transmission and PCV gases into the engine crankcase. Accordingly, if the intake manifold vacuum is less than the crankcase vacuum (e.g., intake manifold pressure is greater than crankcase pressure), the crankcase pressure condition is not satisfied.

In another example, the crankcase pressure condition may be satisfied if the crankcase pressure is less than an upper threshold crankcase pressure. If the crankcase pressure is above an upper threshold crankcase pressure, delivering gaseous fuel to the crankcase may over pressurize the oil pan and valve cover oil gaskets. Accordingly, if the crankcase pressure is above the upper threshold crankcase pressure, then the crankcase pressure condition is not satisfied. The upper threshold crankcase pressure may be a predetermined based on the crankcase design, engine operating conditions, oil gaskets, and the like.

If the crankcase pressure condition is satisfied at 320, routine 300 continues to 330 where it may be determined if a PCV valve flow rate ($Q_{PCVV}$) is less than or equal to a blow-by flow rate ($Q_{B-B}$). $Q_{PCVV}$ may be determined from engine operating conditions such as a fuel injection rate, an intake air/fuel ratio, and an exhaust gas oxygen sensor. For example, the exhaust gas oxygen sensor may indicate the rate of fuel and air combusted in the engine, and the flow rate of fuel and air delivered to the engine may be provided by the fuel injection rate and the intake air/fuel ratio. Thus, in one example, $Q_{PCVV}$ may be inferred from a difference between the flow rate of fuel and air delivered to the engine and the rate of fuel and air combusted in the engine. $Q_{B-B}$ may be a calculated flow rate based on engine design, engine wear, and engine operating conditions such as engine speed, load, and the like. For example, $Q_{B-B}$ may be larger for engines with appreciable wear as compared to a newer engine, and $Q_{B-B}$ may increase when engine speed and load are increased. Calculation of $Q_{B-B}$, and determining $Q_{PCVV}$ may be performed by control system 190.

At 330, if $Q_{PCVV}$ is determined to be greater than $Q_{B-B}$, routine 300 continues to 340 where the gaseous fuel flow control valve 152 fluidly coupled to transmission 148 is opened to direct gaseous fuel, for example methane, to the transmission and from there on to a fresh air intake of PCV system 116, as illustrated in FIGS. 1 and 2. In one example, the gaseous fuel from fuel line 104 may be directed to the transmission and thereupon, via line 151 to an air inflow line such as crankcase ventilation tube 74 of PCV system 116. Thus, the gaseous fuel may be directed from transmission 148 to the crankcase 28 via PCV system 116. In another example, gaseous fuel flowing out of the transmission may be directly piped into crankcase 28. For example, at higher engine loads and higher engine speeds when blow-by gas flow is increased as compared to lower engine loads and lower engine speeds, and crankcase pressure rises, blow-by gases may flow out of crankcase 28 via conduit 76 and via crankcase ventilation tube 74. Accordingly, injecting gaseous fuel from transmission 148 into crankcase 28 (or into crankcase ventilation tube 74 at a location very close to crankcase 28) enables the gaseous fuel to reach the crankcase for increasing engine component lubrication and reducing friction before being blown out into the air intake system for combustion.

Next, routine 300 continues to 350, where the gaseous fuel flow rate is regulated by control system 190 by adjusting the gaseous fuel flow control valve 152 so that the quantity of gaseous fuel ($Q_{gasfuel}$) flowing past the control valve is the difference between $Q_{PCVV}$ and $Q_{B-B}$. Therefore, $Q_{gasfuel}=Q_{PCVV}-Q_{B-B}$. At 360, routine 300 may control flow rate based on various engine and vehicle conditions which will be elaborated in reference to FIG. 4 below.

Figure 4:
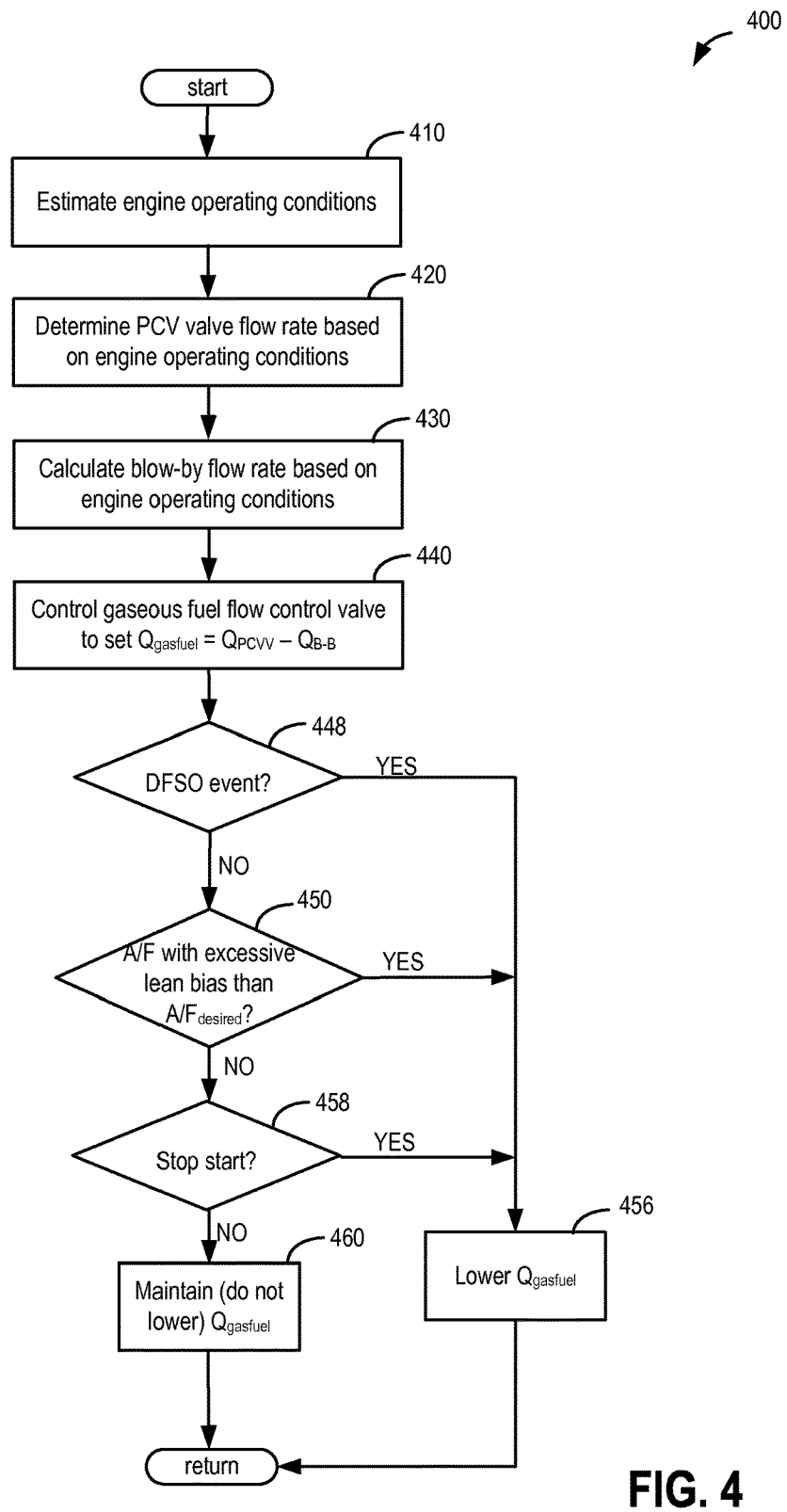
FIG. 4 portrays a flowchart showing an example routine to control gaseous fuel flow.
Figure 5:
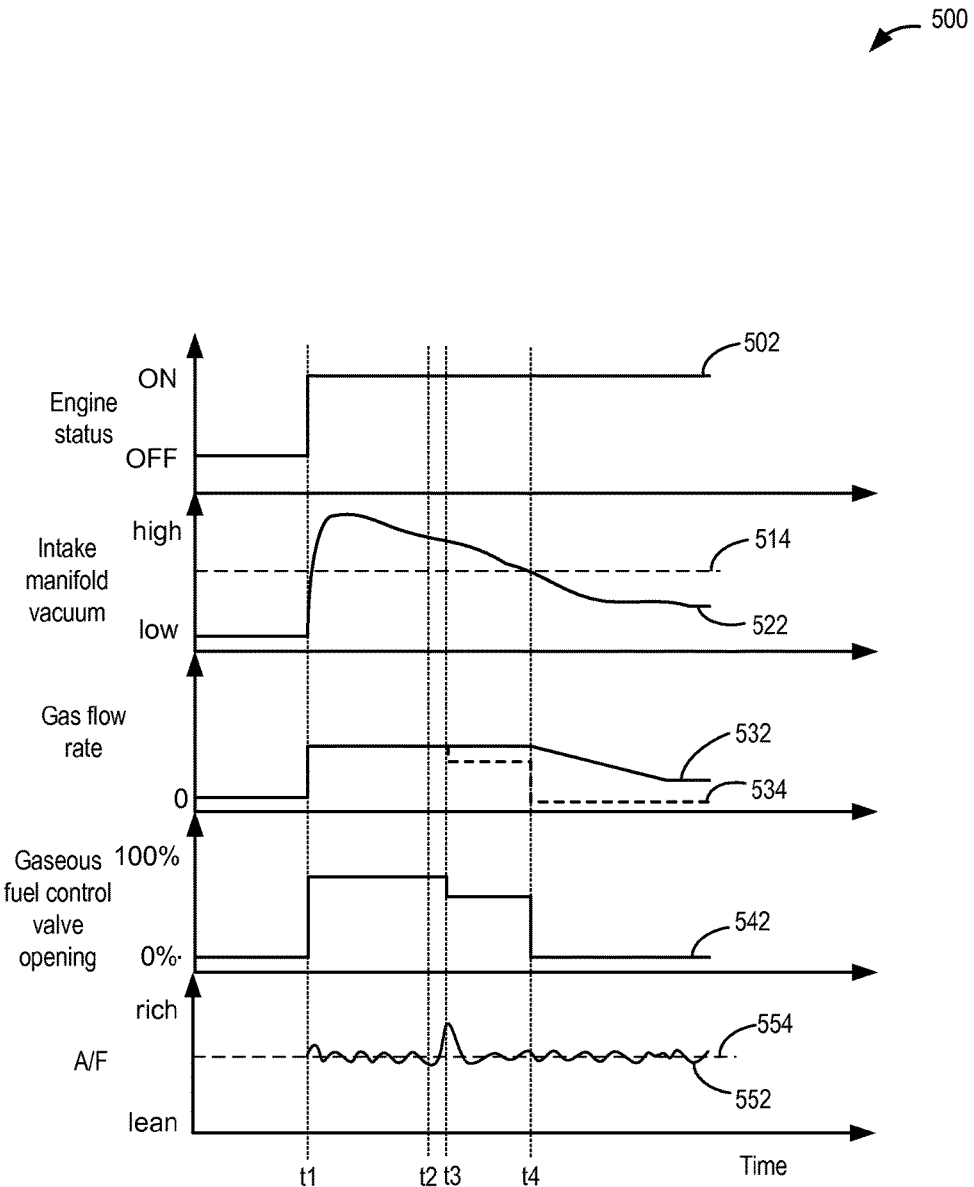
FIG. 5 features an example operation plot depicting various conditions affecting gaseous fuel flow rate.

FIG. 4 illustrates an example routine 400 for vehicle system 100 for controlling the gaseous fuel flow rate to the transmission and PCV system. Specifically, the routine determines a flow rate based on engine conditions and air/fuel ratio. Routine 400 begins at 410 where engine operating conditions such as air/fuel ratio, engine speed, torque, and the like are estimated and/or measured. Routine 400 continues to 420 where $Q_{PCVV}$ may be determined based on engine operating conditions. In one example, as described earlier, $Q_{PCVV}$ may be determined based on a fuel injection rate, an intake air/fuel ratio, and an exhaust gas oxygen sensor. In addition, $Q_{PCVV}$ may be determined using additional engine operating conditions.

Once $Q_{PCVV}$ is determined, routine 400 continues to 430 where Q_B may be calculated based on engine conditions. As described earlier, $Q_{B-B}$ may be a calculated flow rate based on engine design, engine wear, and engine operating conditions such as engine speed, load, and the like. In another example, $Q_{B-B}$ may be calculated from a predetermined model residing in control system 190 using a combination of engine operating conditions.

Next, routine 400 continues to 440, where the gaseous fuel flow control valve may be set by controller 48 such that $Q_{gasfuel}=Q_{PCVV}-Q_{B-B}$. Accordingly, controller 48 may open or close gaseous fuel flow control valve 152 partially or fully in order to deliver gaseous fuel such as methane to the transmission 148 and there on to PCV system 116 to compensate for the difference between PCV valve flow rate, $Q_{PCVV}$, and the blow-by gas flow rate, $Q_{B-B}$.

Routine 400 continues next to 448 where it may be determined if a DFSO event has just occurred. If a DFSO event has just occurred, routine 400 continues to 456 where the quantity of gaseous fuel flowing through the flow control valve 152 may be lowered. $Q_{gasfuel}$ may be lowered according to an excess amount of gaseous fuel delivered from the transmission 148 to PCV system 116, for example, at the crankcase ventilation tube 74. After a DFSO event has occurred, the excess amount of gaseous fuel delivered to the PCV system 116 may be proportional to $Q_{PCVV}-Q_{B-B}$.

In another example, the supply of gaseous fuel to the transmission and PCV system may be stopped. Stopping $Q_{gasfuel}$ after a DFSO event may aid in decelerating the vehicle since gaseous fuel would no longer provide lubrication and reduction of friction of the engine components, and friction in the engine may increase. As a further example, $Q_{gasfuel}$ may be turned off prior to an upcoming DFSO event, during the period in which the engine is performing torque management in anticipation of the DFSO event, which may allow for more prompt purging or burning of the remaining gaseous fuel in the crankcase.

If a DFSO event has not occurred, routine 400 continues to 450 where it may be determined if an air/fuel ratio, A/F, has a lean bias than a desired air/fuel ratio, $A/F_{desired}$. $A/F_{desired}$ may be based on engine operating conditions such as engine speed and load, fuel injection rate, purge flow from a purge canister, found fuel (outgassing of fuel from the oil), gaseous fuel flow to the PCV system, recirculated blow-by gases, and the like in order to maintain fuel economy and to reduce emissions. Estimating and controlling the gaseous fuel flow to the PCV system may aid in estimating and controlling A/F. For example, characterization of the pulse width and pressure drop of a solenoid gaseous fuel flow control valve 152 may aid in estimating the contribution of gaseous fuel flow to the PCV system to A/F. A/F may be measured using intake and/or exhaust gas oxygen sensors.

In one example, if the calculated $Q_{B-B}$ is lower than the actual blow-by gas flow rate, feed forward A/F may be excessively lean biased and $Q_{gasfuel}$ may be greater than $Q_{PCVV}-Q_{B-B,actual}$. The higher $Q_{gasfuel}$ in this example may result in A/F ratio being richer than $A/F_{desired}$. If A/F is determined to be richer than $A/F_{desired}$, routine 400 continues to 456 from 450, where $Q_{gasfuel}$ is lowered. The amount that $Q_{gasfuel}$ is lowered may depend on the difference between A/F and A/F$_{desired}$, and Q$_{PCVV}$–Q$_{B-B}$. For example, Q$_{gasfuel}$ may be lowered by an amount proportional to the difference between A/F$_{desired}$ and A/F, and proportional to Q$_{PCVV}$–Q$_{B-B}$. Other methods of lowering Q$_{gasfuel}$ may be used, including stopping Q$_{gasfuel}$. In carrying out routine 400, control system 190 may achieve a gas fuel flow rate to the PCV system 116 to maintain A/F at A/F$_{desired}$ and to set Q$_{gasfuel}$=Q$_{PCVV}$–Q$_{B-B}$.

From 450, the routine continues to 458 where it may be determined if a stop start event has occurred. For example, the engine may be temporarily shut down and then restarted when the vehicle is stopped at a traffic light in order to reduce the amount of time spent idling and thereby, improve fuel economy and reduce emissions. If a stop start event is confirmed, routine 400 continues to 456 where Q$_{gasfuel}$ is lowered or disabled during engine shutdown. If a stop start event is not confirmed, routine 400 continues to 460 to maintain, (not lower), Q$_{gasfuel}$, for example, independent of the values of A/F$_{desired}$ and Q$_{PCVV}$–Q$_{B-B}$.

It will be appreciated that if the supply of gaseous fuel through the flow control valve is shut off during a DFSO or a stop start event, any excess gaseous fuel may be diverted to a purge canister for storage. The stored fuel may be purged at a later time from the canister into the combustion chamber or into the transmission based on operating conditions.

Returning now to 320, and 330 of routine 300, if the crankcase pressure condition is not satisfied at 320, or if Q$_{PCVV}$ is ≤Q$_{B-B}$ at 330, then routine 300 continues to 346. At 346, the gaseous fuel flow control valve 152 may be closed to stop delivery of gaseous fuel to the transmission 148. Next, routine 300 continues to 356, where three-way valve 154 may be opened to direct gaseous fuel in fuel line 104 to purge canister 158 for storage. Further, any excess gaseous fuel within the transmission may be diverted to purge canister 158 via three way valve 153.

Gaseous fuel stored in purge canister 158 may be directed to engine 110 for combustion via three-way valve 155 or to transmission 148 depending on vehicle operating conditions. For example, if a purge canister pressure is greater than a PCV system pressure, then gaseous fuel stored in purge canister 158 may be directed to the transmission and there on to PCV system 116 via three-way valve 155 by control system 190. Purge canister pressure may include a pressure sensor for determining purge canister pressure and for communicating said purge canister pressure to control system 190. PCV system pressure may be indicated for example, by pressure sensor 86 or by a pressure sensor mounted in the PCV system 116 such as at crankcase 28, or in crankcase ventilation tube 74. Routine 300 ends after 360 and 356.

In this way, a gaseous fuel may be delivered from an existing gaseous fuel source to a transmission and a crankcase based on PCV flow rate. Gaseous fuel flow may be initiated in response to the blow-by gas flow rate falling below the PCV valve flow rate when a manifold vacuum is greater than a crankcase vacuum, the crankcase vacuum increasing with an increasing engine speed. The gaseous fuel may also be delivered at a flow rate of a difference between the PCV valve flow rate and the blow-by gas flow rate. Gaseous fuel delivery may be stopped if the engine is shut down either as part of a stop start event or when the vehicle is parked. Fuel flow may also be disabled when the manifold vacuum is lower than a crankcase vacuum. Further still, flow rate of the gaseous fuel may be lowered in response to an air/fuel ratio being leaner than a desired air/fuel ratio.

When delivery of the gaseous fuel is lowered (e.g., DFSO), an excess gaseous fuel amount delivered to the PCV fresh air line may be estimated. The gaseous flow rate to the transmission may be decreased by an amount corresponding to said excess gaseous fuel amount. Further, excess fuel contained within the fuel lines or the transmission when gaseous flow is lowered or discontinued (for e.g., stop start event) may be directed to a purge canister fluidly coupled to the transmission and the engine. The gaseous fuel may be transferred from the purge canister to the transmission at a later time responsive to the blow-by flow rate being less than the PCV valve flow rate, and purge canister pressure being greater than a PCV air inlet line pressure. Turning now to FIG. 5, it illustrates an example operation map 500 plotted against time depicting a method to reduce friction in a transmission and crankcase of a vehicle system based on operating conditions. Plot 502 depicts engine status, plot 522 portrays a variation in intake manifold vacuum, plot 532 shows a variation in gaseous fuel flow rate as a difference between Q$_{PCVV}$ and Q$_{B-B}$, plot 534 illustrates a variation in quantity of fuel flowing to the transmission and the PCV system, Q$_{gasfuel}$, plot 542 represents an opening of gaseous fuel flow control valve, and plot 552 depicts a variation in air/fuel ration (A/F). Line 514 represents crankcase vacuum and line 554 represents a desired air/fuel ratio (A/F$_{desired}$).

Prior to time t1, the engine is shut down (OFF) as depicted by 502, the intake manifold vacuum 522 is lower than crankcase vacuum 514, the gaseous fuel flow control valve opening 542 is 0% (e.g., closed), and Q$_{PCVV}$, Q$_{B-B}$, Q$_{PCVV}$–Q$_{B-B}$ 532, and Q$_{gasfuel}$ 534 are all zero. At t1, an engine is turned on and as the engine status changes from OFF to ON, intake manifold vacuum 522 rises above crankcase vacuum 514, and Q$_{PCVV}$–Q$_{B-B}$ 532 is greater than zero (e.g., Q$_{PCVV}$>Q$_{B-B}$), and a first condition is thereby satisfied. Accordingly, the control system 190 opens the gaseous fuel flow control valve 152 (in FIG. 1) and sets the gaseous fuel flow control valve opening 542 such that Q$_{gasfuel}$ 534 is equivalent to Q$_{PCVV}$–Q$_{B-B}$ 532 between t1 and t2. Thus gaseous fuel, for example methane gas, is delivered to the transmission 148 and there on into PCV system 116 in order to help reduce friction losses in the transmission and engine crankcase and enable cooling. Furthermore, the gaseous fuel may be delivered to the transmission 148 and PCV system 116 at a flow rate that makes up the difference between the Q$_{PCVV}$ and Q$_{B-B}$. Further still, the gaseous fuel may be delivered from the transmission to an air inflow line such as crankcase ventilation tube 74 of PCV system 116 via a gaseous fuel flow control valve 153. Further, between t1 and t2, the A/F ratio 552 remains comparable to a desired A/F ratio 554.

At t2, A/F 552 is determined to be richer than A/F$_{desired}$ 554. A/F may be more than A/F$_{desired}$ because calculated Q$_{B-B}$ may be less than the actual blow-by flow rate.

Therefore, at t3, Q$_{gasfuel}$ 534 is adjusted lower by reducing the opening of gaseous fuel flow control valve 542. Therefore, A/F ratio reduces beyond t3 and is comparable to a desired A/F ratio 554. Since a first condition remains satisfied where the intake manifold vacuum 522 is greater than the crankcase vacuum 514, the engine status 502 continues to be ON, and Q$_{PCVV}$–Q$_{B-B}$ is greater than zero, the gaseous fuel flow is reduced but not shut off.

At t4, the intake manifold vacuum 522 becomes less than the crankcase vacuum 514. As such, the first condition is no longer satisfied, and control system 190 closes the gaseous fuel control valve opening 542, thereby stopping delivery of gaseous fuel to the transmission and therefore, to PCV system 116. When the intake manifold vacuum 522 becomes less than the crankcase vacuum 514, air and gaseous fuel delivered to crankcase ventilation tube 74 may not be adequately fed to crankcase 28.

In this way, power losses due to friction in an engine transmission and crankcase may be lowered by delivering a gaseous fuel to a transmission and crankcase via a PCV system of an engine. The gaseous fuel flow through the PCV system may advantageously assist in clearing out existing blow-by gases within the crankcase and may be piped into the engine fuel line for combustion, minimizing fuel losses. By using a fuel such as methane, with a lower density than air, oil droplets suspended in the air within a crankcase may impinge on each other, combine and form fewer, larger drops reducing the effective density. Basing the quantity of gaseous fuel supplied for lubrication on the difference between a PCV valve flow rate and a modeled blow-by flow rate may ensure that excessive amounts of gas do not overflow the PCV system. Thus, by using judicious quantities of gaseous fuel for reducing friction, fuel economy may be further enhanced.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
an engine;
a natural gas source; and
a transmission enclosed within a transmission case, the transmission case and the transmission being fluidly coupled to the natural gas source via a flow control valve and fluidly coupled to a positive crankcase ventilation (PCV) fresh air line of the engine.

2. The vehicle system of claim 1 wherein the flow control valve is configured to control a flow of natural gas into the transmission.

3. The vehicle system of claim 1, further comprising a purge canister fluidly coupled to the transmission and to the natural gas source.

4. The vehicle system of claim 1, wherein a viscosity of the natural gas is lower than a viscosity of air.

5. The vehicle system of claim 1, wherein the natural gas source comprises methane.

6. A method for an engine, comprising:
delivering a natural gas from a natural gas source to a transmission of the engine by adjusting a control valve with a controller based on a PCV flow determined by the controller.

7. The method of claim 6, further comprising:
initiating a delivery of natural gas from the natural gas source to the transmission via the control valve in response to a blow-by gas flow rate falling below a PCV valve flow rate as determined by the controller.

8. The method of claim 7 further comprising disabling flow of natural gas into the transmission via the control valve when a manifold vacuum is greater than a crankcase vacuum as determined by the controller.

9. The method of claim 7, wherein the natural gas is delivered via the valve at a flow rate of a difference between the PCV valve flow rate and the blow-by gas flow rate.

10. The method of claim 6, further comprising stopping the delivery of natural gas from the natural gas source to the transmission via the control valve responsive to a determination that the engine is stopped.

11. The method of claim 9, further comprising lowering the flow rate of the natural gas via the control valve in response to an air/fuel ratio with excessive lean bias as sensed by a sensor.

12. The method of claim 7, further comprising in response to a deceleration fuel shut off event,
determining, via the controller, an excess natural gas amount delivered to the transmission, and
lowering a flow rate of the natural gas via the control valve by an amount corresponding to the excess natural gas amount.

13. The method of claim 12, further comprising storing excess natural gas in a purge canister fluidly coupled to the transmission, a PCV system, and the natural gas source.

14. The method of claim 7, further comprising, in response to a vehicle stop start event,
determining, via the controller, an excess natural gas amount delivered to the transmission, and
lowering a flow rate of the natural gas via the control valve by an amount corresponding to the excess natural gas amount.

15. The method of claim 14, further comprising storing excess natural gas in a purge canister fluidly coupled to the transmission, a PCV system, and the natural gas source.

16. A vehicle, comprising:
an engine including a transmission fluidly coupled to a natural gas source via a flow control valve,
the transmission being fluidly coupled to a fresh air intake line of a PCV system; and
a controller having executable instructions stored in memory to deliver natural gas from the natural gas source to the transmission responsive to a blow-by flow rate being less than a PCV valve flow rate.

17. The vehicle of claim 16, wherein the flow control valve is configured to deliver the natural gas at a natural gas flow rate of a difference between the PCV valve flow rate and the blow-by gas flow rate.

18. The vehicle of claim 16, wherein the executable instructions further comprise closing the flow control valve in response to the engine being stopped.

19. The vehicle of claim 16, wherein the executable instructions further comprise closing the flow control valve in response to manifold vacuum being lower than crankcase vacuum.

\* \* \* \* \*